United States Patent
Yamada (10) Patent No.: US 8,942,898 B2
(45) Date of Patent: Jan. 27, 2015

(54) RANGE SWITCHOVER APPARATUS

(71) Applicant: Denso Corporation, Kariya, Aichi-pref. (JP)

(72) Inventor: Jun Yamada, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/916,887

(22) Filed: Jun. 13, 2013

(65) Prior Publication Data

US 2014/0025266 A1   Jan. 23, 2014

(30) Foreign Application Priority Data

Jul. 18, 2012   (JP) .................................. 2012-159532

(51) Int. Cl.
  *F16H 59/10* (2006.01)
  *F16H 61/32* (2006.01)
  *F16H 63/38* (2006.01)
  *F16H 61/28* (2006.01)

(52) U.S. Cl.
  CPC .............. *F16H 59/105* (2013.01); *F16H 63/38* (2013.01); *F16H 61/32* (2013.01); *F16H 2061/283* (2013.01); *F16H 2061/326* (2013.01)
  USPC .................................. 701/51; 701/64; 477/34

(58) Field of Classification Search
  CPC ....... F16H 59/08; F16H 59/105; F16H 61/32; F16H 63/38; F16H 2061/283; F16H 2061/326
  See application file for complete search history.

(56) References Cited

U.S. PATENT DOCUMENTS

| | | | |
|---|---|---|---|
| 2005/0043878 A1* | 2/2005 | Kotter et al. ..................... | 701/51 |
| 2006/0033464 A1* | 2/2006 | Nakai et al. ................... | 318/701 |
| 2006/0207373 A1* | 9/2006 | Amamiya et al. ......... | 74/473.36 |
| 2006/0276300 A1* | 12/2006 | Kashiwagi et al. ............. | 477/34 |
| 2008/0001568 A1* | 1/2008 | Hori et al. ..................... | 318/652 |
| 2010/0294066 A1* | 11/2010 | Itazu et al. ................. | 74/473.12 |
| 2012/0123653 A1 | 5/2012 | Kimura et al. | |
| 2013/0024079 A1* | 1/2013 | Sekiya et al. ................... | 701/51 |
| 2013/0110364 A1* | 5/2013 | Yamada et al. ................ | 701/61 |

FOREIGN PATENT DOCUMENTS

| | | |
|---|---|---|
| JP | 5-241230 | 9/1993 |
| JP | 5-322038 | 12/1993 |
| JP | H07-81448 | 3/1995 |
| JP | 2009-115219 | 5/2009 |

OTHER PUBLICATIONS

Office Action (2 pages) dated Jun. 25, 2014, issued in corresponding Japanese Application No. 2012-159532 and English translation (3 pages).

* cited by examiner

*Primary Examiner* — Michael J Zanelli
(74) *Attorney, Agent, or Firm* — Nixon & Vanderhye PC

(57) ABSTRACT

In a range switchover control apparatus, a microcomputer checks, under a state that driving force of a motor is released, whether a range switchover mechanism is at rest and whether the range switchover mechanism is at rest in a bottom position, that is, whether an engagement member is fitted deep into a bottom of a range holding recess. If the range switchover mechanism is at rest in the bottom position, an encoder count value at a reference position (bottom position of a P-range) is calculated based on a present range and an encoder count value. By using the present range and the calculated encoder count value, an encoder count value of the bottom position of the present range can be determined. Based on this encoder count value, the encoder count value at the reference position can be calculated.

8 Claims, 9 Drawing Sheets

FIG. 10
SECOND EMBODIMENT

FIG. 11
THIRD EMBODIMENT

FIG. 12 FOURTH EMBODIMENT

RANGE SWITCHOVER APPARATUS

CROSS REFERENCE TO RELATED APPLICATION

This application is based on and incorporates herein by reference Japanese patent application No. 2012-159532 filed on Jul. 18, 2012.

FIELD

The present disclosure relates to a range switchover apparatus, which switches over a shift range by a motor as a drive source.

BACKGROUND

Recently mechanical drive systems are changed to electrical motor-drive systems in vehicles to meet requests for reducing space, improving assembling work and improving control ability. In one exemplary apparatus, as disclosed in JP-A-H07-81448, a motor is used to drive a shift range switchover mechanism of an automatic transmission of a vehicle. In this apparatus, a control shaft is coupled to a rotation shaft of the motor through a reduction mechanism so that the shift range is switched over by driving a range switchover valve by the control shaft. In this apparatus, a position sensor is provided to output a signal corresponding to a position of the range switchover valve. By utilizing a play (backlash) existing in a power transfer path from the motor to the position sensor, a detection value of the position sensor is learned as an output value of the position sensor indicating a specific shift range position. This learning is performed when a change in the detection value of the position sensor becomes small within a range, in which the detection value of the position sensor can be recognized as the specific shift range position, during a period of shift range switchover, that is, while the motor is rotationally driven.

It is proposed to switch over a shift range to a target range by using an encoder, which outputs a pulse signal in synchronism with rotation of the motor, and to rotationally drive the motor to a target rotation position (target count value), which corresponds to a target range, based on a count value of the pulse signal of the encoder (encoder count value). In this system, it is required to learn a reference position based on the encoder count value and control the amount of rotation (rotation angle) of the motor relative to the encoder count value indicating the reference position.

According to the above-described apparatus, however, the reference position is learned by the detection value of the position sensor, which is affected by a play amount existing in a power transfer path from the motor to the position sensor. It is therefore not possible to learn the reference position accurately based on the count of the encoder, which is attached in the power transfer path from the motor to the encoder without play) and outputs the pulse signal in synchronism with the rotation of the motor.

SUMMARY

It is therefore an object to provide a range switchover apparatus, which learns a reference position based on an encoder count value with high accuracy, in a system, which rotationally drives a motor based on a count value of a pulse signal of an encoder outputting the pulse signal in synchronism with rotation of the motor.

According to one aspect, a range switchover apparatus includes a motor, a range switchover mechanism for switching over a shift range among plural ranges by the motor, an encoder for outputting a pulse signal in synchronism with rotation of the motor, and a detent mechanism for holding the range switchover mechanism at each range position by allowing an engagement member to be fitted in a range holding recess, when the range switchover mechanism is switched over to each range position. The range switchover apparatus further includes a control unit for controlling a switchover position of the range switchover mechanism by rotationally driving the motor based on an encoder count value indicative of a count value of the pulse signal of the encoder.

The control unit includes a resting check part, a range check part and a reference position check part. The resting check part checks whether the range switchover mechanism is at rest with the engagement member being fitted in a bottom position of the range holding recess, by checking whether the range switchover mechanism is at rest with drive force of the motor being released. The range check part checks which one of the ranges the present shift range is. The reference position calculation part calculates an encoder count value at a predetermined reference position based on the present shift range determined by the range check part and the encoder count value, when the range switchover mechanism is determined to be at rest in the bottom position by the resting check part.

DETAILED DESCRIPTION OF THE EMBODIMENT

A range switchover apparatus will be described with reference to plural embodiments, FIG. 1 to FIG. 9.

First Embodiment

Figure 1:
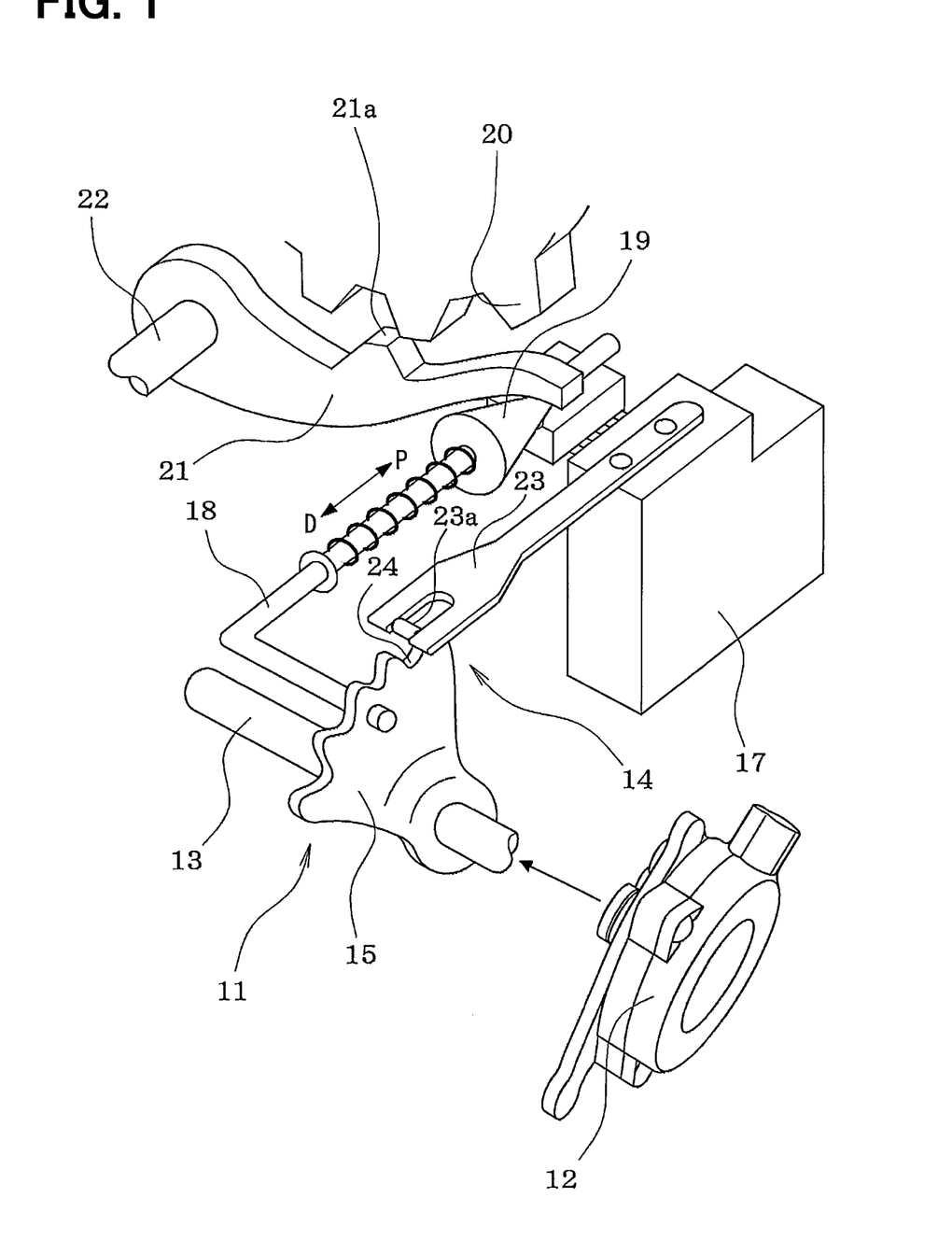
FIG. 1 is a perspective view of a range switchover apparatus according to a first embodiment.
Figure 2:
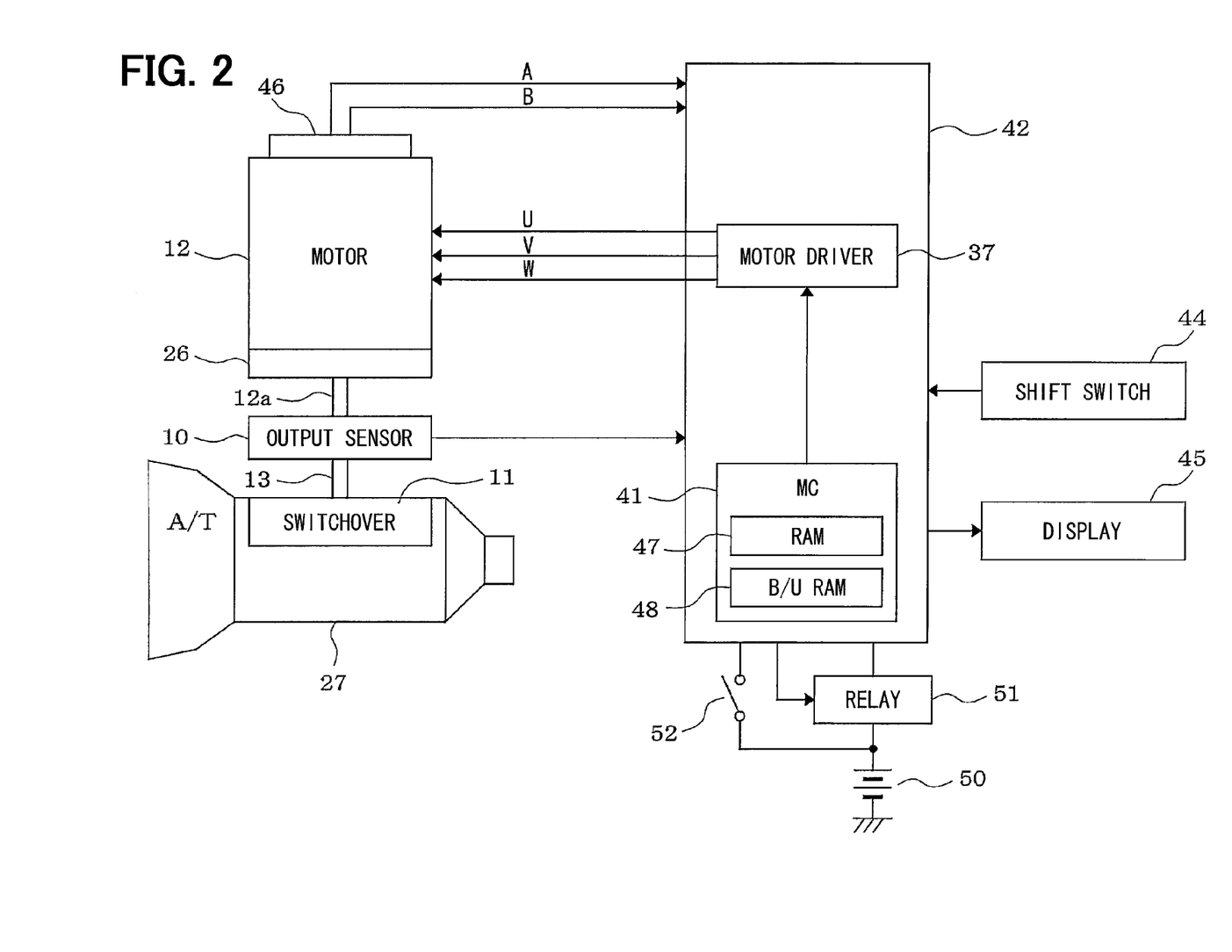
FIG. 2 is a block diagram of an entire control system of the range switchover apparatus shown in FIG. 1.
Figure 3:
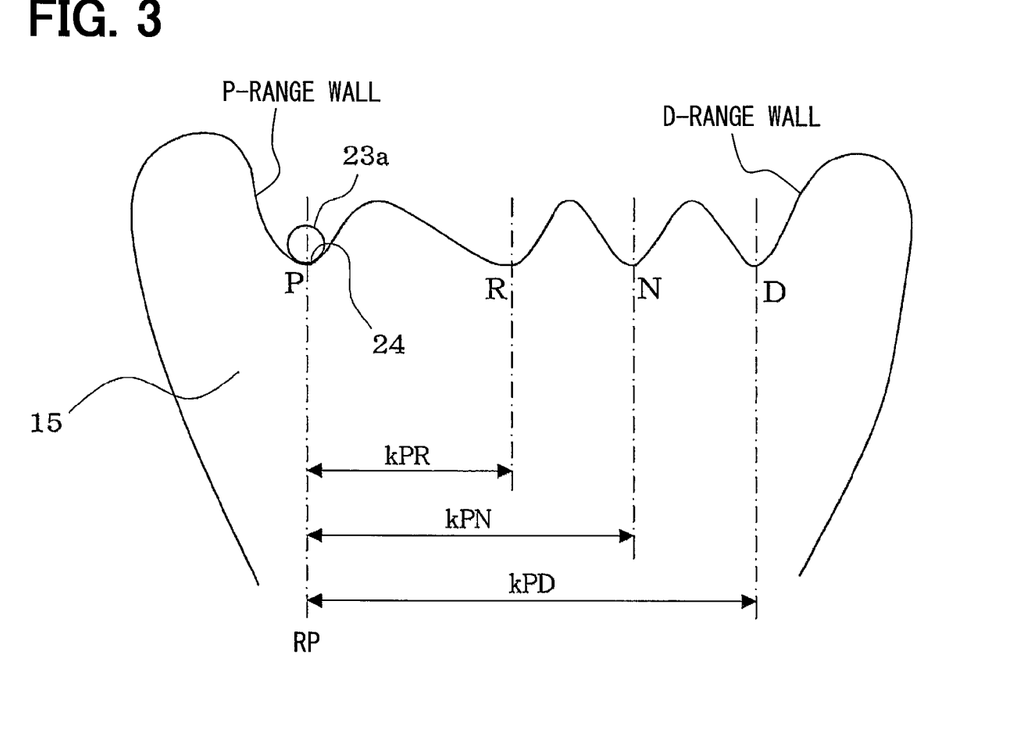
FIG. 3 is a schematic view of a detent lever used in the first embodiment.

Referring to FIG. 1 and FIG. 2, a range switchover apparatus 11 is applied to a four-position range switchover mechanism, which switches over a shift range among a P-range (parking range), an R-range (reverse range), an N-range (neutral range) and a D-range (drive range).

The range switchover mechanism 11 is a four-position range switchover mechanism. As shown in FIG. 2, the range switchover mechanism 11 switches over a shift range of an automatic transmission 27 among the P-range, the R-range, the N-range and the D-range. The range switchover mechanism 11 uses as its drive source a motor 12, which is for example a switched reluctance motor. The motor 12 has a reduction mechanism 26 therein and has an output shaft sensor 10, which detects a rotation position of its output shaft 12a. A manual shaft 13 is coupled to the output shaft 12a of the motor 12.

As shown in FIG. 1, a detent lever 15 is fixed to the manual shaft 13. A manual valve (not shown) is coupled to the detent lever 15 to move linearly in correspondence to rotation of the detent lever 15. The manual valve is provided to switch over a hydraulic pressure circuit (not shown) in the automatic transmission 27 for switching over a shift range.

An L-shaped parking rod 18 is fixed to the detent lever 15. A conical body 19 provided at a top end of the parking rod 18 contacts a lock lever 21. The lock lever 21 moves up and down about an axis 22 in correspondence to a position of the conical body 19 to lock and unlock a parking gear 20. The parking gear 20 is provided about the output shaft of the automatic transmission 27 (FIG. 2). When the parking gear 20 is locked by the lock lever 21, drive wheels of a vehicle are held in a rotation-stop state (parking state).

A detent spring 23 is fixed to a support base 17 for holding the detent lever 15 in each of ranges P, R, N and D. The detent lever 15 is formed with range holding recesses 24 (FIG. 3) in correspondence to the ranges P, R, N and D. When an engagement member 23a provided at the top end of the detent spring 23 falls or moves down to be fitted in any one of the range holding recesses 24, the detent lever 15 is held in the corresponding one of the ranges. The detent lever 15 and the detent spring 23 form a detent mechanism 14 (restraint mechanism), which engages and holds a rotation position of the detent lever 15 in the corresponding one of positions of the shift ranges (that is, holds the range switchover mechanism 11 in corresponding one of positions of the shift ranges).

In the P-range, the parking rod 18 is moved in a direction to approach the lock lever 21 so that the large-diameter part of the conical body 19 lifts the lock lever 21 to fit a protrusion 21a of the lock lever 21 in the parking gear 20 for locking the parking gear 20. Thus the output shaft of the automatic transmission 27 (drive wheels) is held in the locked state (parking state).

In the other ranges than the P-range, the parking rod 18 is moved in a direction leaving away from the lock lever 21, the large-diameter part of the conical body 19 is pulled out of the lock lever 21 to lower the lock lever 21 and disengage the protrusion 21a of the lock lever 21 from the parking gear 20. As a result, the output shaft of the automatic transmission 27 is held in a rotatable state (travelable state).

The output shaft sensor 10 is formed as a rotation sensor (for example, a potentiometer), which outputs a voltage corresponding to a rotation angle of the output shaft 12a of the reduction mechanism 26 of the motor 12. It is thus possible to confirm whether the actual shift range is the P-range, the R-range, the N-range or the D-range based on the output voltage. Even when the output shaft sensor 10 is not provided, an encoder 46 described later can confirm whether the actual shift range is either one of the P-range, the R-range, the N-range and the D-range.

As shown in FIG. 2, the motor 12 is provided with the encoder 46, which detects the rotation angle (rotation position) of a rotor of the motor 12. The encoder 46 may be a magnetic rotary-type encoder. The encoder 46 is configured to output pulse signals of A-phase and B-phase to a range switchover control apparatus 42 in synchronism with rotation of the rotor of the motor 12 at every predetermined angular interval. The range switchover control apparatus 42 is provided with a microcomputer (MC) 41, which counts both rising edge and falling edge of the A-phase signal and the B-phase signal outputted from the encoder 46. Further the microcomputer 41 rotationally drives the motor 12 by switching over the power supply phase of the motor 12 in a predetermined sequence by a motor driver 37 based on the count value of the encoder 46 (encoder count value ENC). It is possible to provide two systems, each including three-phase (U, V, W) coils of the motor 12 and the motor drivers 37, so that, even when one system fails, the motor 12 is rotationally driven by the other system.

While the motor 12 is in rotation, the direction of rotation of the motor 12 is determined based on the order of generation of the A-phase signal and the B-phase signal. The encoder count value is counted up in a case of rotation in a normal direction (direction of rotation from P-range to D-range). The encoder count value is counted down in a case of rotation in a reverse direction (direction of rotation from D-range to P-range). Thus, even when the motor 12 is rotated in any one of the normal direction and the reverse direction, the relation of correspondence between the encoder count value and the rotation angle of the motor 12 is maintained. It is therefore possible to detect the rotation position of the motor 12 based on the encoder count value in any of the normal rotation and the reverse rotation and rotationally drive the motor 12 by supplying electric power to a phase coil, which corresponds to the detected rotation position.

The range switchover control apparatus 42 receives a signal indicating a shift lever operation position detected by a shift switch 44. The microcomputer 41 of the range switchover control apparatus 42, which is provided as an electronic control unit, thus switches over a target range in response to the shift lever operation or the like of a driver, switches over the shift range by driving the motor 12 in correspondence to the target range, and display the switched-over actual shift range on a display 45 provided in an instrument panel (not shown) in the vehicle.

The range switchover control apparatus 42 is supplied with a power supply voltage from a battery 50 (power source) mounted on the vehicle through a power supply relay 51. The power supply relay 51 is turned on and off by manually turning on and off an IG switch 52 (ignition switch) provided as a power supply switch. When the IG switch 52 is turned on, the power supply relay 51 is turned on to apply the power supply voltage to the range switchover control apparatus 42. When the IG switch 52 is turned off, the power supply relay 51 is turned off to shut off power supply to the range switchover control apparatus 42.

Since the encoder count value is stored in a RAM (not shown) of the microcomputer 41, the stored encoder count value disappears when the power supply to the range switchover control apparatus 42 is turned off. The encoder count value of the range switchover control apparatus 42 available at the time immediately after turning on the power supply does not correspond to the actual rotation position (power supply phase) of the motor 12. It is therefore necessary to match the encoder count value and the actual rotation position of the motor 12 after the power supply is turned on so that the encoder count value and the power supply phase correspond to each other, for switching over the power supply phase in accordance with the encoder count value.

The microcomputer 41 therefore learns a relation of correspondence between a power supply phase and an encoder count value of the motor 12 by initially driving the motor 12 after the power supply is turned on. In this initial driving operation, a switchover of the power supply phase of the motor 12 is attained one cycle sequentially in a predetermined time schedule in open-loop control so that a power supply phase and a rotation position of the motor 12 are matched in either one of power supply phases and the motor 12 is driven to rotate. Then edges of the A-phase signal and the B-phase signal of the encoder 46 are counted. When the initial driving operation of the motor 12 is finished, a relation of correspondence among the encoder count value, the rotation position of the motor 12 and the power supply phase is learned.

The microcomputer 41 checks whether the initial drive learning processing is executed successfully or unsuccessfully based on the pattern of the A-phase signal and the B-phase signal of the encoder 26 at the time of finishing the initial driving operation.

The microcomputer 41 therefore learns (calculates) the encoder count value at a predetermined reference position in the following manner by performing routines shown in FIG. 4 through FIG. 8. It is checked whether the range switchover mechanism 11 is fitted in the bottom position (valley) of the range switchover mechanism 11, that is, the engagement member 23a is fitted deep into the bottom of the range holding recess 24, and at rest (in a stationary state), by checking whether the range switchover mechanism 11 is at rest in a state that the drive force of the motor 12 is released, that is, in a state that the drive force of the motor is not applied. It is further checked which range the present range (present shift range) is. If it is determined that the range switchover mechanism 11 is at rest in the bottom position, the encoder count value is calculated in the predetermined position (for example, bottom position of the P-range) based on the present range and the encoder count value.

When the drive force of the motor 12 is released, the range switchover mechanism 11 finally remains at rest, that is, the engagement member 23a is fitted deep into the bottom of the range holding recess 24. Therefore, by checking whether the range switchover mechanism 11 is at rest with the drive force of the motor 12 being released, it is possible to check whether the range switchover mechanism 11 is at rest in the bottom position in the range switchover mechanism 11. If it is determined that the range switchover mechanism 11 is at rest at the bottom position of the range switchover mechanism 11, the encoder count value corresponding to the bottom position of the present range can be determined with high accuracy by using the present range and the encoder count value. The encoder count value at a predetermined reference position (for example, the bottom position of the P-range) can be calculated with high accuracy based on the encoder count value at the bottom position of the present range.

Specifically, if the present range is the P-range and the encoder count value equals ENC under a state that the range switchover mechanism 11 is determined to be at rest in the bottom position, the encoder count value at the bottom position of the P-range equals ENC. Therefore, the encoder count value ENC at the bottom position of the P-range is directly used as the encoder counter value at the reference position RP (bottom position of the P-range).

$$RP=ENC$$

If the present range is the R-range and the encoder count value equals ENC under a state that the range switchover mechanism 11 is determined to be at rest in the bottom position, the encoder count value at the bottom position of the R-range equals ENC. Therefore, the encoder count value at the reference position (bottom position of the P-range) is calculated by subtracting a predetermined value kPR from the encoder count value ENC at the bottom position of the R-range. The predetermined value kPR (FIG. 3) is a change amount in the encoder count value ENC from the bottom position of the P-range to the bottom position of the R-range.

$$RP=ENC-kPR$$

If the present range is the N-range and the encoder count value equals ENC under a state that the range switchover mechanism 11 is determined to be at rest in the bottom position, the encoder count value at the bottom position of the N-range equals ENC. Therefore, the encoder count value at the reference position (bottom position of the P-range) is calculated by subtracting a predetermined value kPN from the encoder count value ENC at the bottom position of the N-range. The predetermined value kPN is a change amount in the encoder count value from the bottom position of the P-range to the bottom position of the N-range.

$$RP=ENC-kPN$$

If the present range is the D-range and the encoder count value equals ENC under a state that the range switchover mechanism 11 is determined to be at rest in the bottom position, the encoder count value at the bottom position of the D-range equals ENC. Therefore, the encoder count value at the reference position (bottom position of the P-range) is calculated by subtracting a predetermined value kPD from the encoder count value ENC at the bottom position of the D-range. The predetermined value kPD is a change amount in the encoder count value from the bottom position of the P-range to the bottom position of the D-range.

$$RP=ENC-kPD$$

When a target range is switched over by a shift lever operation by a driver after learning the reference position as described above, the microcomputer 41 correspondingly changes a target rotation position (target count value). Each time the target rotation position is changed, the microcomputer 41 switches over the power supply phase of the motor 12 based on the encoder count value and performs feedback control for rotationally driving the motor 12 to the target rotation position so that the shift range is switched over to the target range, that is, the switchover position of the range switchover mechanism is switched over to the position of the target range.

The processing of routines shown in FIG. 4 to FIG. 8, which the microcomputer 41 of the range switchover control apparatus 42 performs, will be described below.

(Shift Range Storage Processing Routine)

Figure 4:
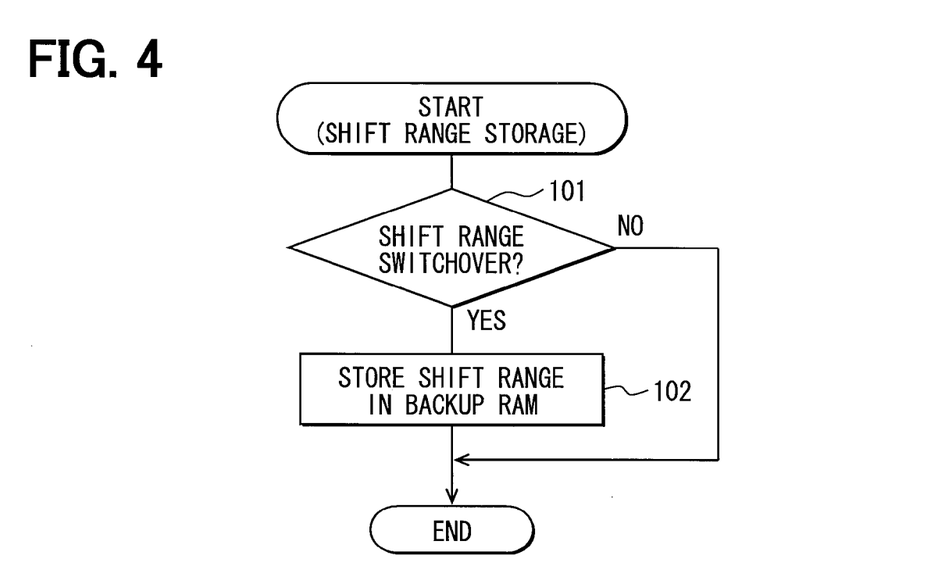
FIG. 4 is a flowchart showing processing of a shift range storage processing routine in the first embodiment.

A shift range storage processing routine shown in FIG. 4 is executed by the microcomputer 4 repetitively at every predetermined interval while power supply to the range switchover control apparatus 42 is turned on. When this routine is started, it is checked first at step 101 based on the output signal of the output shaft sensor 10 or the encoder count value whether the shift range is switched over. If it is determined that the shift range is switched over, step 102 is executed to update the shift range, which is after the switchover, and store the updated shift range in a backup RAM 48, which is a rewritable non-volatile memory capable of holding the stored data even while the power supply to the range switchover control apparatus 42 is turned off. If it is determined that the shift range is not switched over, this routine is finished without execution of step 102. Thus, each time the shift range is switched over, the shift range stored in the backup RAM 48 is updated to a new shift range after switchover and stored in the backup RAM 48. After the power supply to the range switchover control apparatus 42 is turned off, the shift range at the time of stopping the operation of the microcomputer 41 (stopping of power supply) is stored and maintained in the backup RAM 48 (storage device).

(Present Range Check Routine)

Figure 5:
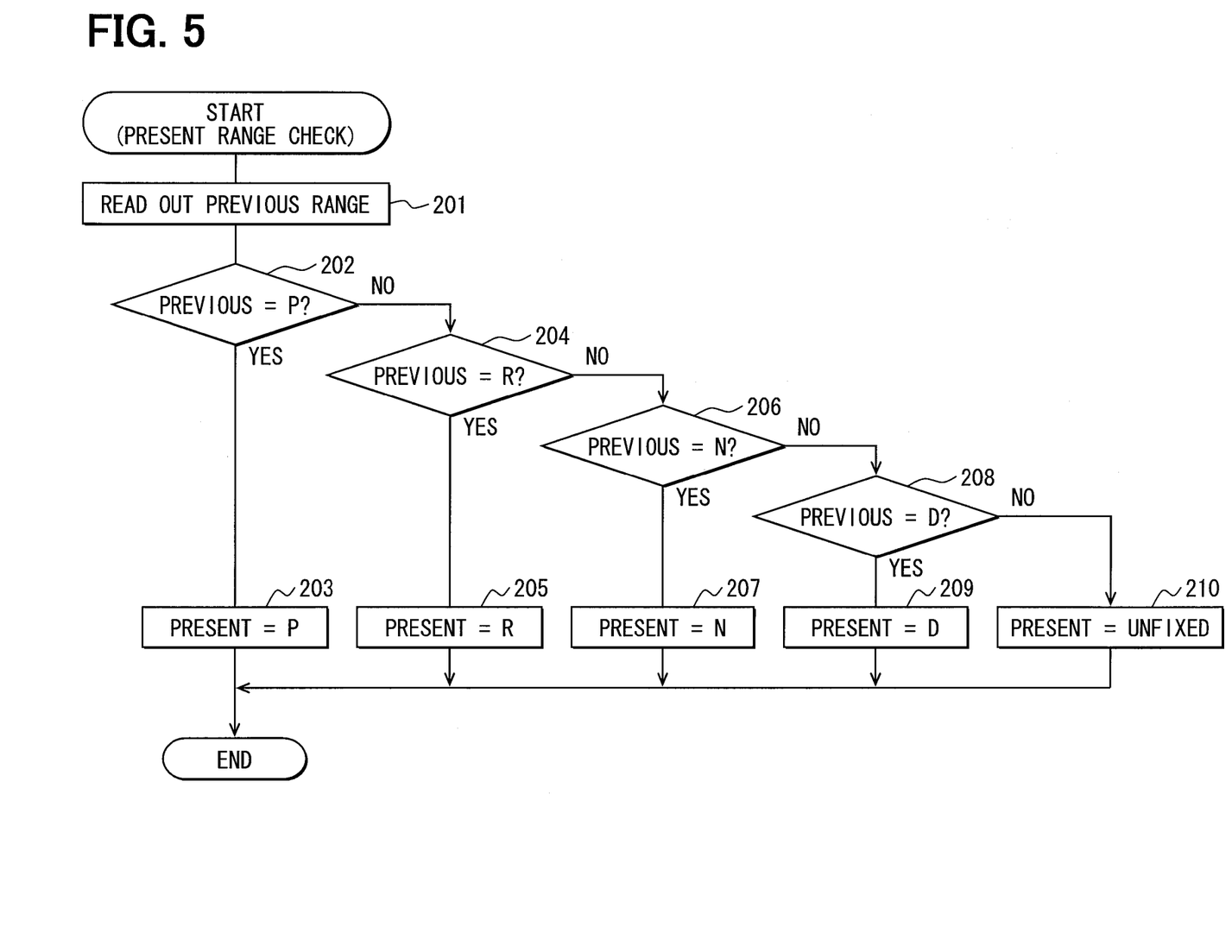
FIG. 5 is a flowchart showing processing of a present range check routine in the first embodiment.

A present range check routine shown in FIG. 5 is executed immediately after activation of the microcomputer 41 of the range switchover control apparatus 42. When this routine is started, a value of the shift range stored at the time of last operation stop of the microcomputer 41, that is, the previous shift range (last shift range) stored in the backup RAM 48, is read out from the backup RAM 48 at step 201.

Then at step 202, it is checked whether the previous range (shift range at the time of last operation stop) is the P-range. If it is determined that the previous range is the P-range, step 203 is executed to determine that the present range is the P-range.

If it is determined at step 202 that the previous range is not the P-range, step 204 is executed to check whether the previous range is the R-range. If it is determined that the previous range is the R-range, step 205 is executed to determine that the present range is the R-range.

If it is determined at step 204 that the previous range is not the R-range, step 206 is executed to check whether the previous range is the N-range. If it is determined that the previous range is the N-range, step 207 is executed to determine that the present range is the N-range.

If it is determined at step 206 that the previous range is not the N-range, step 208 is executed to check whether the previous range is the D-range. If it is determined that the previous range is the D-range, step 209 is executed to determine that the present range is the D-range.

Thus when the stored value of the previous range is available at the time of activation of the microcomputer 41, either one of the steps 202, 204, 206 and 208 results in YES and the present range is determined to be the previous range initially.

When the stored value of the previous range is not available at the time of activation of the microcomputer 41, on the other hand, all the steps 202, 204, 206 and 208 result in NO and the present range is determined to be unfixed at step 210.

(Hitting Control Request Check Routine)

Figure 6:
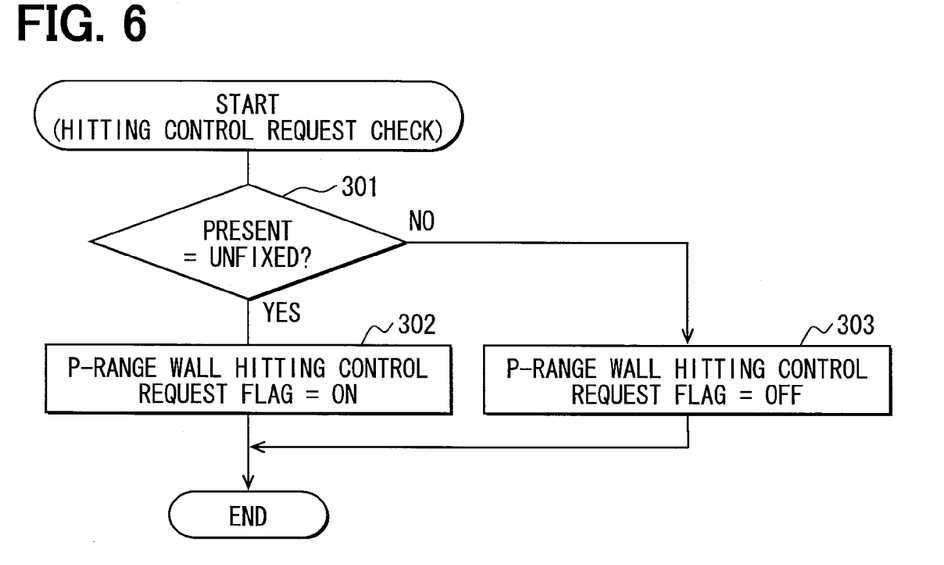
FIG. 6 is a flowchart showing processing of a hitting control request check routine in the first embodiment.

A hitting control request check routine shown in FIG. 6 is executed repetitively at every predetermined interval by the microcomputer 41 while the power supply to the range switchover control apparatus 42 is turned on. When this routine is started, it is checked first at step 301 whether the present range is unfixed. If it is determined that the present range is unfixed, that is, value of the previous range is not stored in the backup RAM 48, step 302 is executed to turn on a P-range wall hitting control request flag (ON). In this case, after finishing the initial driving operation, a P-range wall hitting control is performed to check whether the present range is the P-range, by rotating the motor 12 until the engagement member 23*a* of the detent spring 23 hits a P-range wall (side wall of the P-range holding recess 24 shown in FIG. 3), which is a limit position of a movable range of the range switchover mechanism 11 at the P-range side. Thus it is possible to check the present shift range by switching over the shift range forcibly to the P-range by the P-range wall hitting control.

If it is determined at step 301 that the present range is not unfixed, that is, the present range is fixed, step 303 is executed to turn off the P-range wall hitting control request flag (OFF).

In this case, the P-range wall hitting control is not performed. These routines shown in FIG. 5 and FIG. 6 correspond to a present range check part.

(Resting Check Routine)

Figure 7:
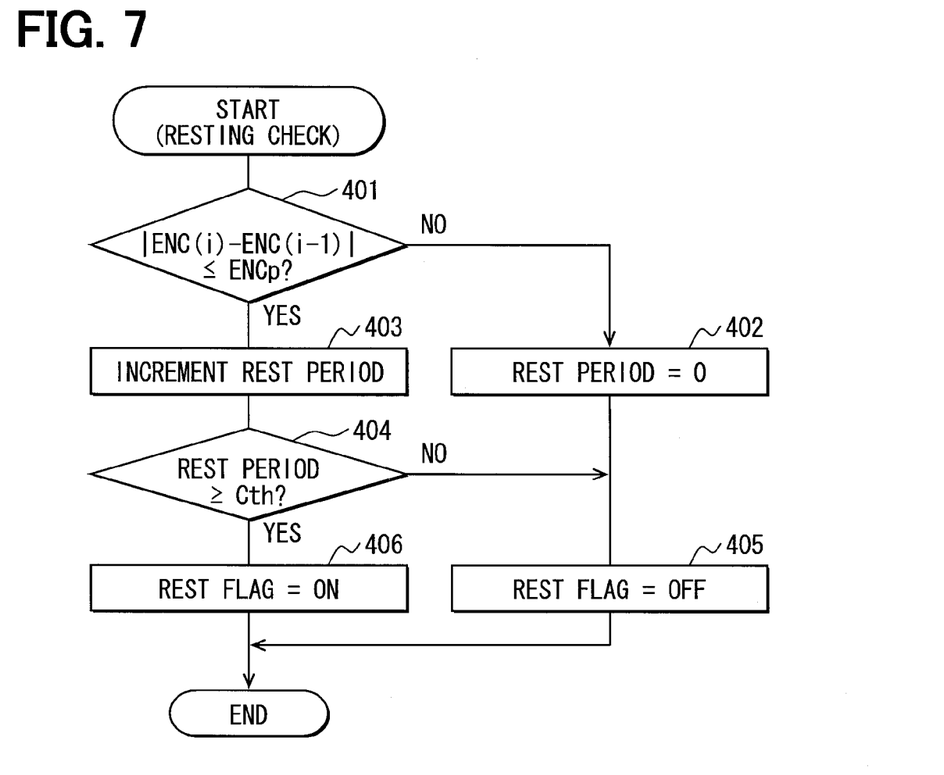
FIG. 7 is a flowchart showing processing of a resting check routine in the first embodiment.

A resting check routine shown in FIG. 7 is executed repetitively at every predetermined interval by the microcomputer 41 while the power supply to the range switchover control apparatus 42 is turned on. When this routine is started, it is first checked at step 401 whether the change amount of the encoder count value (for example, an absolute value of a difference between a present value ENC(i) and a previous value ENC(i−1)) is equal to or less than a predetermined value ENCp (for example, 1). If it is determined that the change amount of the encoder count value is greater than the predetermined value, step 402 is executed to maintain the count value of a rest period counter at zero or reset the same. Then, the resting check flag is maintained to be OFF or reset, thereby finishing the present routine.

If it is determined at step 401 that the change amount of the encoder count value is less than the predetermined value, step 403 is executed to count up the count value of the rest period counter by 1. Then at step 404, it is checked at step 404 whether the count value of the rest period counter is equal to or greater than a threshold value Cth (for example 10).

If it is determined at step 404 that the count value of the rest period counter is less than the threshold value, step 405 is executed to maintain the resting check flag (rest flag) at OFF or reset the same, thus finishing this routine.

When it is determined at step 404 that the count value of the rest period counter is equal to or greater than the threshold value, the range switchover mechanism 11 is determined to be at rest. In this case, at step 406, the resting check flag is set to ON.

(Reference Position Calculation Routine)

Figure 8:
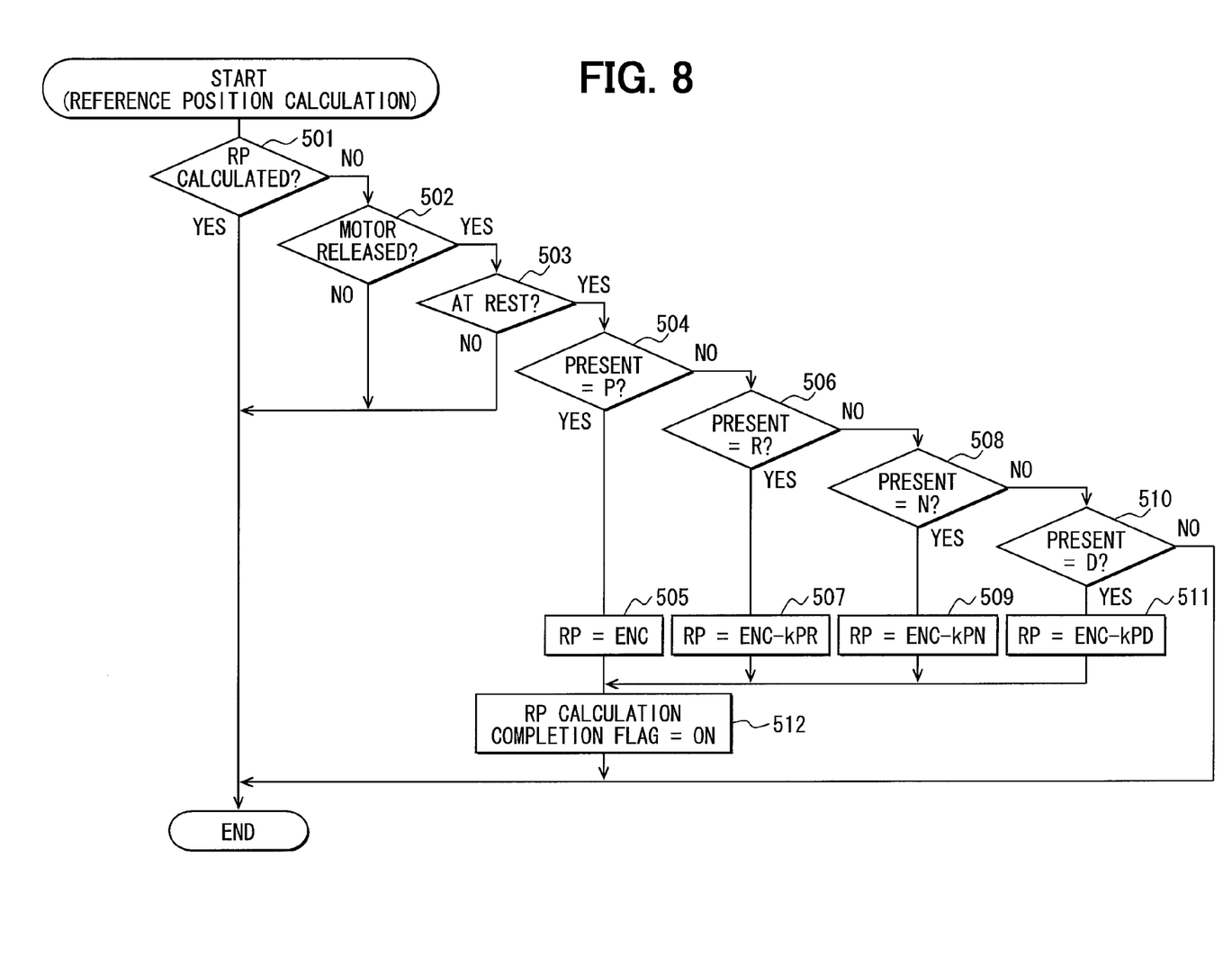
FIG. 8 is a flowchart showing processing of a reference position calculation routine in the first embodiment.

A reference position calculation routine shown in FIG. 8 is executed repetitively at every predetermined interval by the microcomputer 41 while the power supply to the range switchover control apparatus 42 is turned on. This routine corresponds to a reference position calculation part. When this routine is started, it is checked first at step 501 whether calculation of the reference position RP is completed based on whether a reference position calculation completion flag described later is ON.

If it is determined at step 501 that the calculation of reference position is not completed yet, it is checked at step 502 whether the drive force of the motor 12 is released and further checked at step 503 whether the range switchover mechanism 11 is at rest based on whether the resting check flag is ON. If step 502 or 503 results in NO, this routine is finished without executing processing related to the reference position calculation, which is performed at step 504 and subsequent steps.

If it is determined at step 502 that the driving force of the motor 12 is released, that is, the range switchover mechanism 11 is not driven by the motor 12, and determined at step 503 that the range switchover mechanism 11 is at rest, it is determined that the range switchover mechanism 11 is at rest at the bottom position. Processing of the reference position calculation executed at step 504 and subsequent steps is performed as described below. Steps 502, 503, the routine shown in FIG. 7 and the like correspond to a resting check part.

It is first checked at step 504 whether the present range is the P-range. If it is determined that the present range is the P-range, step 505 is executed to use the encoder count value ENC itself as the encoder count value at the reference position RP (bottom position of the P-range). This is because, when the present range is the P-range and the encoder count value equals ENC, the encoder count value at the bottom position of the P-range equals ENC.

*RP=ENC*

If it is determined at step 504 that the present range is not the P-range, step 506 is executed to check whether the present range is the R-range. If it is determined that the present range is the R-range, step 507 is executed. When the present range is the R-range and the encoder count equals ENC, the encoder count value at the bottom position of the R-range equals ENC. Therefore, the encoder count value at the reference position (bottom position of the P-range) is calculated by subtracting the predetermined value kPR from the encoder count value ENC at the bottom position of the R-range. The predetermined value kPR (FIG. 3) is the amount of change in the encoder count value from the bottom position of the P-range to the bottom position of the R-range. This predetermined value kPR is preset based on experimental data, design data and the like.

*RP=ENC−kPR*

If it is determined at step 506 that the present range is not the R-range, step 508 is executed to check whether the present range is the N-range. If it is determined that the present range is the N-range, step 509 is executed. When the present range is the N-range and the encoder count equals ENC, the encoder count value at the bottom position of the N-range equals ENC. Therefore, the encoder count value at the reference position (bottom position of the P-range) is calculated by subtracting the predetermined value kPN from the encoder count value ENC at the bottom position of the N-range. The predetermined value kPN (FIG. 3) is the amount of change in the encoder count value from the bottom position of the P-range to the bottom position of the N-range. This predetermined value is preset based on experimental data, design data and the like.

*RP=ENC−kPN*

If it is determined at step 508 that the present range is not the N-range, step 510 is executed to check whether the present range is the D-range. If it is determined that the present range is the D-range, step 511 is executed. When the present range is the D-range and the encoder count equals ENC, the encoder count value at the bottom position of the D-range equals ENC. Therefore, the encoder count value at the reference position (bottom position of the P-range) is calculated by subtracting the predetermined value kPD from the encoder count value ENC at the bottom position of the D-range. The predetermined value kPD (refer to FIG. 3) is the amount of change in the encoder count value from the bottom position of the P-range to the bottom position of the D-range. This predetermined value is preset based on experimental data, design data and the like.

*RP=ENC−kPD*

After calculation of the reference position at any one of steps 505, 507, 509 and 511, step 512 is executed to set the reference position calculation completion flag to ON.

Figure 9:
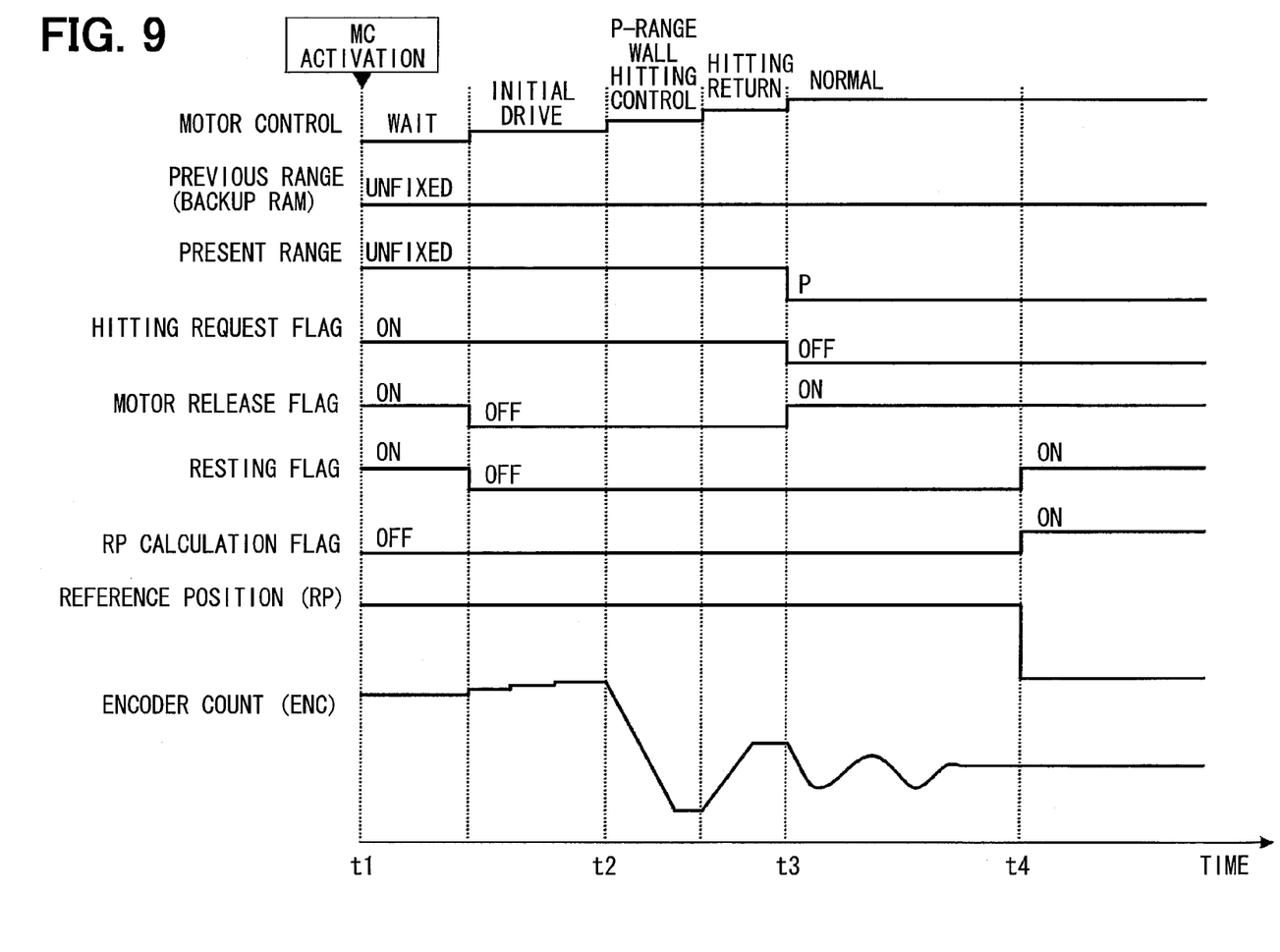
FIG. 9 is a time chart showing one example of reference position learning in the first embodiment.

Exemplary operation of the reference position learning in the first embodiment described above will be described with reference to a time chart shown in FIG. 9.

It is assumed that, at time t1, power supply to the range switchover control apparatus 42 is turned on and the microcomputer 41 is activated. If no stored value of the previous range (shift range at the end of previous operation) is available, it is determined that the present range is unfixed and the P-range wall hitting control request flag is set to ON. When the initial driving operation is finished at time t2, the P-range wall hitting control is performed. After forcibly switching over the shift range to the P-range by the P-range wall hitting control, it is checked whether the present range is the P-range. If the stored value of the previous range is available at time t1 of activation of the microcomputer 41, it is determined that the present range is the previous range.

When the drive force of the motor 12 is released at time t3, the motor drive force release state flag is set to ON. Further, when the change amount of the encoder count value is decreased to be less than the predetermined value and the range switchover mechanism 11 is determined to be at rest at time t4, the resting check flag is set to ON. When the motor drive force release state flag is ON and the resting check flag is ON at time t4 (that is, at time point that the range switchover mechanism 11 is determined to be at rest in a state that the drive force of the motor 12 is released), the range switchover mechanism 11 is determined to be at rest at the bottom position. The encoder count value at the reference position (bottom position of the P-range) is calculated based on the present range and the encoder count value. The reference position calculation completion flag is thus set to ON.

When the drive force of the motor 12 is released, the range switchover mechanism 11 finally rests at the bottom position. Since the encoder count value fluctuates in correspondence to vibration of the range switchover mechanism 11 before the range switchover mechanism 11 comes to stop, it is highly likely that the reference position is recognized erroneously.

According to the first embodiment, however, it is checked whether the range switchover mechanism 11 is at rest at the bottom position by checking whether the range switchover mechanism 11 is at rest in the state that the drive force of the motor 12 is released. If the range switchover mechanism 11 is determined to be at rest at the bottom position, the encoder count value at the reference position (bottom position of the P-range) is calculated based on the present range and the encoder count value. By using the present range and the encoder count value when the range switchover mechanism 11 is determined to be at rest at the bottom position, the encoder count value at the bottom position of the present range can be calculated accurately. Further the encoder count value at the reference position can be calculated accurately based on the calculated encoder count value at the bottom position of the present range. Thus the reference position can be learned accurately by the encoder count value and erroneous recognition of the reference position can be prevented.

In the P-range wall hitting control, the range switchover mechanism 11 and the mechanism 14 are loaded comparatively heavily. As a result, if the present range is checked by performing the P-range wall hitting control at every activation of the microcomputer 41, it is likely that the durability of the range switchover mechanism 11 and the mechanism 14 will be lowered.

According to the first embodiment, however, it is determined that the present range is the same as the previous range if the stored value of the previous range is available. If no stored value of the previous range is available, the P-range wall hitting control is performed to check the present range. Thus, at the time of activation of the microcomputer 41, the present range is determined to be the previous range normally. Only when the stored value of the previous range is not stored, the present range is determined by performing the P-range wall hitting control. As a result, the number of times of performing the P-range wall hitting control can be reduced and durability of the range switchover mechanism 11 and the mechanism 14 can be improved.

According to the first embodiment, the range switchover mechanism 11 is determined to be at rest if the change amount of the encoder count value is equal to or less than the predetermined value. As a result, the range switchover mechanism 11 can be determined to be at rest quickly at the time the range switchover mechanism 11 is confirmed to be at rest based on the change amount of the encoder count value.

Second Embodiment

A second embodiment will be described with reference to FIG. 10. The second embodiment is similar to the first embodiment and different from the first embodiment only in respect of the resting check routine.

Figure 10:
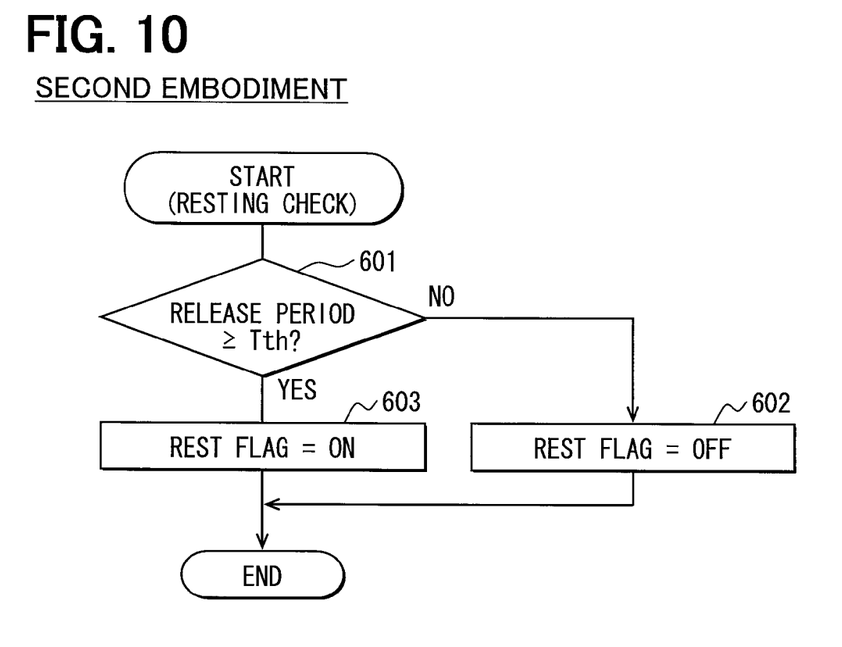
FIG. 10 is a flowchart showing processing of a resting check routine in a second embodiment.

That is, in the second embodiment, the microcomputer 41 is configured to perform a resting check routine shown in FIG. 10 in place of the resting check routine shown in FIG. 7 thereby to determine that the range switchover mechanism 11 is at rest when the drive force of the motor 12 is in a released state for a predetermined period or longer.

In the resting check routine shown in FIG. 10, it is first checked at step 601 whether a drive force release period, which indicates an elapse of time after the drive force of the motor 12 is released, is equal to or longer than the predetermined period.

This predetermined period is preset to a threshold period Tth (for example, 1 second), which is required for the range switchover mechanism 11 to rest after the drive force of the motor 12 is released, or longer based on experimental data, design data and the like.

If it is determined at step 601 that the drive force release period is shorter than the predetermined period, step 602 is executed to maintain the rest flag at OFF or reset the same thereby finishing this routine.

At time the drive force release period is determined to be equal to or longer than the predetermined period at step 601, that is, when the drive force of the motor 12 is released continuously for the predetermined period or longer, it is determined that the range switchover mechanism 11 is at reset. Then step 603 is executed to set the rest flag to ON.

According to the second embodiment described above, it is determined that the range switchover mechanism 11 is at rest when the drive force of the motor 12 is continuously released for the predetermined period or longer. For this reason, it is not necessary to monitor the change amount in the encoder count value for checking whether the range switchover mechanism 11 is at rest and the processing of this at resting checking can be simplified.

According to the first and the second embodiments, the present range is determined to be the previous range if the stored value of the previous range is available at the time of activation of the microcomputer 41. The present range is determined by performing the P-range wall hitting control if the stored value of the previous range is not available. However, without being limited to this, it is possible to determine the present range by performing the P-range wall hitting control every time the microcomputer 41 is activated.

It is also possible, without being limited to the P-range wall hitting control, to perform for example the D-range wall hitting control to determine that the present range is the D-range. The D-range wall hitting control is performed by rotationally driving the motor 12 until the engagement member 23a of the detent spring 23 hits the D-range wall (side wall of the D-range holding recess 24), which is a limit position of a movable range of the range switchover mechanism 11 at the D-range side.

Third Embodiment

A third embodiment will be described with reference to FIG. 11. The second embodiment is similar to the first embodiment but different from the first embodiment only in respect of the present range check routine.

Figure 11:
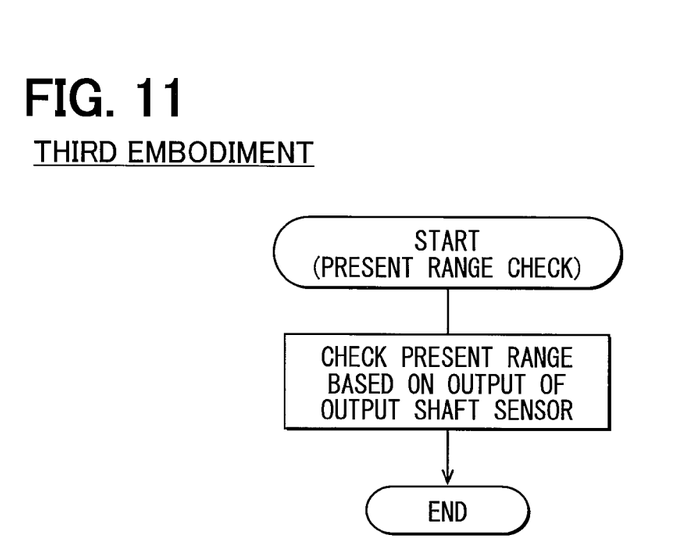
FIG. 11 is a flowchart showing processing of a present range check routine in a third embodiment.

That is, in the third embodiment, the microcomputer 41 is configured to perform a present range check routine shown in FIG. 11 thereby to check whether the present range is the P-range, the R-range, the N-range and the D-range based on the output voltage of the output voltage sensor 10. The P-range wall hitting control need not be performed for determining the present range. As a result, the durability of the range switchover mechanism 11 and the mechanism 14 can be improved.

Fourth Embodiment

A fourth embodiment will be described with reference to FIG. 12. The fourth embodiment is similar to the first embodiment but different from the first embodiment only in respect that the range switchover control apparatus is applied to a two-position type range switchover mechanism, which changes a shift range between a P-range and a non-P-range.

Figure 12:
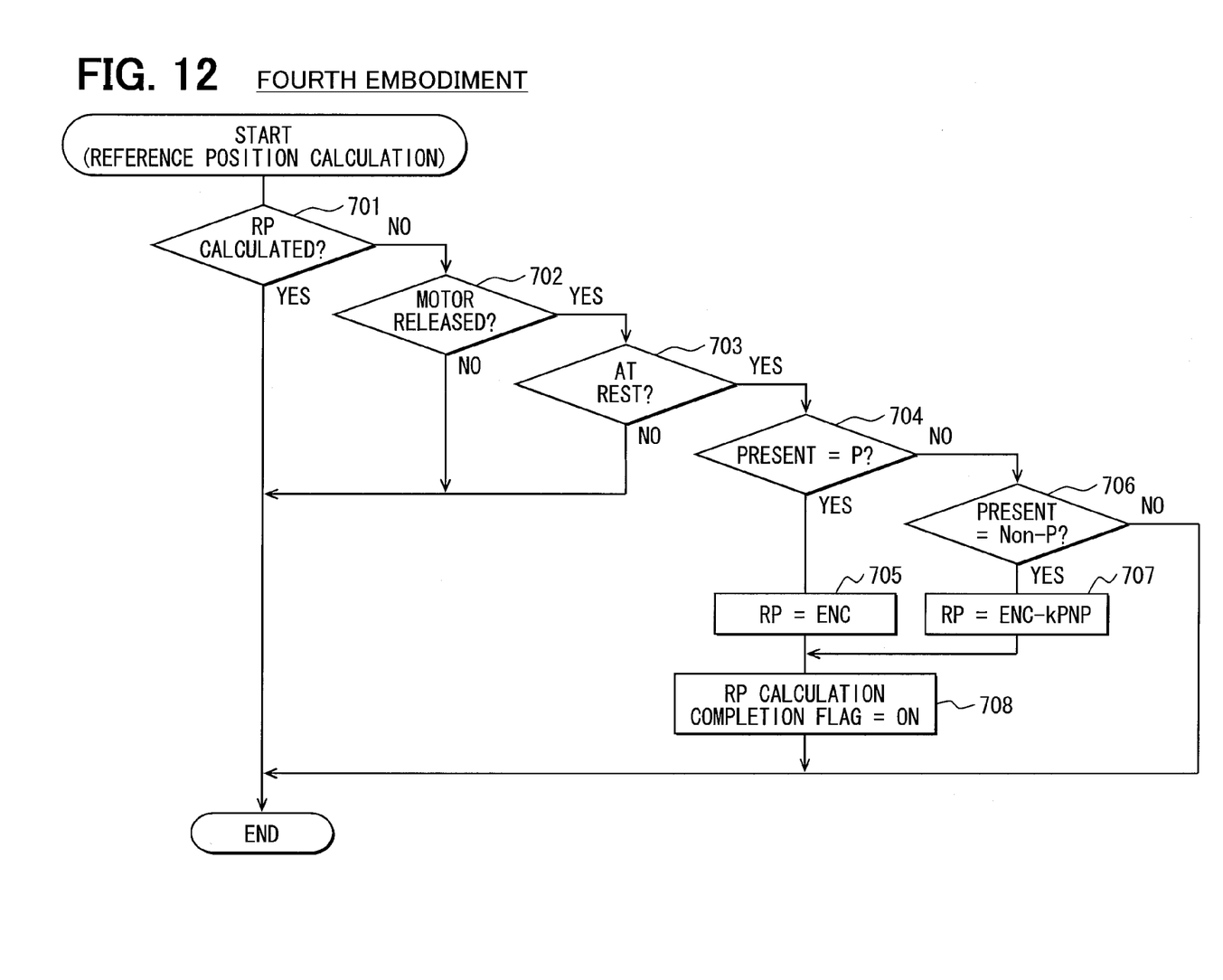
FIG. 12 is a flowchart showing processing of a reference position calculation routine in a fourth embodiment.

In the fourth embodiment, the microcomputer 41 is configured to perform a reference position calculation routine shown in FIG. 12. In this routine, when the range switchover mechanism 11 is determined to be at rest in the bottom position, the encoder count value at the reference position (bottom position of the P-range) is calculated based on the present range and the encoder count value.

In the reference position calculation routine shown in FIG. 12, it is checked first at step 701 whether calculation of the reference position RP is completed. If it is determined that the calculation of reference position is not completed yet, it is checked at step 702 whether the drive force of the motor 12 is released and further checked at step 703 whether the range switchover mechanism 11 is at rest.

If it is determined at step 702 that the driving force of the motor 12 is in the released state and determined at step 703 that the range switchover mechanism 11 is at rest, it is determined that the range switchover mechanism 11 is at rest at the bottom position. Processing of the reference position calculation executed at step 704 and subsequent steps is performed as described below.

It is first checked at step 704 whether the present range is the P-range. If it is determined that the present range is the P-range, step 705 is executed to use the encoder count value ENC itself as the encoder count value at the reference position (bottom position of the P-range). This is because, when the present range is the P-range and the encoder count value equals ENC, the encoder count value at the bottom position of the P-range equals ENC.

$$RP=ENC$$

If it is determined at step 704 that the present range is not the P-range, step 706 is executed to check whether the present range is the Non-P-range. If it is determined that the present range is the Non-P-range, step 707 is executed. When the present range is the Non-P-range and the encoder count equals ENC, the encoder count value at the bottom position of the Non-P-range equals ENC. Therefore, the encoder count value at the reference position (bottom position of the P-range) is calculated by subtracting the predetermined value kPNP from the encoder count value ENC at the bottom position of the R-range. The predetermined value kPNP is the amount of change in the encoder count value from the bottom position of the P-range to the bottom position of the Non-P-range. This predetermined value is preset based on experimental data, design data and the like.

$$RP = ENC - kPNP$$

After the reference position is calculated at step 705 or step 707, step 708 is executed to set the reference position calculation completion flag to ON. The fourth embodiment described above also provides substantially the same advantage as the first embodiment.

In the above-described embodiments, the reference position RP is assumed to be the bottom position of the P-range. However, it may be the bottom position of the D-range or the bottom range of the Non-P-range. In the above-described embodiments, the encoder 46 uses a magnetic-type encoder. However, the encoder 46 may be, for example, an optical-type encoder or a brush-type encoder. Further, the encoder 46 is not limited to the encoder, which outputs the A-phase signal and the B-phase signal, but may be an encoder, which outputs a Z-phase signal for correction (for indexing) in addition to the A-phase signal and the B-phase signal.

In the above-described embodiments, the switched reluctance motor (SR motor) is used as the motor 12. However, the motor 12 is not limited to the SR motor but may be other types of brushless-type synchronous motor, which switches over sequentially the power supply phases of the motor by detecting a rotational position of a motor based on a count value of an output signal of an encoder.

In the first to the third embodiments, the range switchover mechanism switches over the shift range among four ranges. In the fourth embodiment, the range switchover mechanism switches over the shift range between two ranges. However, the range switchover mechanism may switch over a shift range among three ranges, five or more ranges.

In addition, the range switchover apparatus is not limited for the automatic transmission (AT, CVT, DCT and the like), but may be implemented in various ways. For example, a range switchover apparatus, which switches over a shift range to switch over the reduction device of an electric vehicle.

What is claimed is:

1. A range switchover apparatus comprising:
   a motor;
   a range switchover mechanism for switching over a shift range among plural ranges by the motor as a drive source;
   an encoder for outputting a pulse signal in synchronism with rotation of the motor;
   a detent mechanism for holding the range switchover mechanism at each range position by allowing an engagement member to be fitted in a range holding recess, when the range switchover mechanism is switched over to each range position; and
   a control unit for controlling a switchover position of the range switchover mechanism by rotationally driving the motor based on an encoder count value indicative of a count value of the pulse signal of the encoder, wherein:
   the control unit is configured to perform a resting check, a range check and a reference position calculation,
   the resting check checks whether the range switchover mechanism is at rest with the engagement member being fitted in a bottom position of the range holding recess, by checking whether the range switchover mechanism is at rest with the drive force of the motor being released,
   the range check checks which one of the ranges the present shift range is,
   the reference position calculation calculates the encoder count value at a predetermined reference position based on the present shift range determined by the range check and the encoder count value, when the range switchover mechanism is determined to be at rest in the bottom position by the resting check;
   the range check checks the present shift range by performing hitting control, in which the motor is rotationally driven to a limit position of a movable range of the range switchover mechanism, and thereafter performing hitting return control, in which the motor is rotationally driven in reverse to return the range switchover mechanism from the limit position to the bottom position; and
   the resting check determines that the range switchover mechanism is at rest, when a change amount of the encoder count value is less than a predetermined value.

2. The range switchover apparatus according to claim 1, wherein:
   the control unit includes a storage for storing, as a previous range, the shift range, to which the range switchover mechanism is switched over when the control unit stopped operation thereof previous time;
   the range check determines the present shift range to be the previous shift range if the previous shift range stored in the storage is available when the control unit starts operation thereof, and checks the present shift range by performing the hitting control if the previous range stored in the storage is unavailable.

3. The range switchover apparatus according to claim 1, wherein:
   the range check checks the present shift range based on an output signal of a rotation sensor, which outputs a signal in correspondence to a rotation angle of an output shaft of the motor.

4. The range switchover apparatus according to claim 1, wherein:
   the detent mechanism includes a spring to bias the engagement member in a direction to be fitted in the range holding recess, and the motor is driven to move the range switchover mechanism against the spring.

5. A range switchover apparatus comprising:
   a motor;
   a range switchover mechanism for switching over a shift range among plural ranges by the motor as a drive source;
   an encoder for outputting a pulse signal in synchronism with rotation of the motor;
   a detent mechanism for holding the range switchover mechanism at each range position by allowing an engagement member to be fitted in a range holding recess, when the range switchover mechanism is switched over to each range position; and
   a control unit for controlling a switchover position of the range switchover mechanism by rotationally driving the motor based on an encoder count value indicative of a count value of the pulse signal of the encoder, wherein:
   the control unit includes a resting check, a range check and a reference position calculation,
   the resting check checks whether the range switchover mechanism is at rest with the engagement member being fitted in a bottom position of the range holding recess, by checking whether the range switchover mechanism is at rest with the drive force of the motor being released,
   the range check checks which one of the ranges the present shift range is;
   the reference position calculation calculates the encoder count value at a predetermined reference position based on the present shift range determined by the range check and the encoder count value, when the range switchover mechanism is determined to be at rest in the bottom position by the resting check;

the range check checks the present shift range by performing hitting control, in which the motor is rotationally driven to a limit position of a movable range of the range switchover mechanism, and thereafter performing hitting return control, in which the motor is rotationally driven in reverse to return the range switchover mechanism from the limit position to the bottom position; and the resting check determines that the range switchover mechanism is at rest when the drive force of the motor is continuously released for more than a predetermined period.

6. A range switchover apparatus according to claim 5, wherein:

the control unit includes a storage for storing, as a previous range, the shift range, to which the range switchover mechanism is switched over when the control unit stopped operation thereof previous time;

the range check determines the present shift range to be the previous shift range if the previous shift range stored in the storage is available when the control unit starts operation thereof, and checks the present shift range by performing the hitting control if the previous range stored in the storage is unavailable.

7. A range switchover apparatus according to claim 5, wherein:

the range check checks the present shift range based on an output signal of a rotation sensor, which outputs a signal in correspondence to a rotation angle of an output shaft of the motor.

8. A range switchover apparatus according to claim 5, wherein the detent mechanism includes a spring to bias the engagement member in a direction to be fitted in the range holding recess, and the motor is driven to move the range switchover mechanism against the spring.

* * * * *